United States Patent [19]

Wada et al.

[11] 4,430,440
[45] Feb. 7, 1984

[54] MAGNETIC HEAD SLIDER MATERIAL

[75] Inventors: Toshiaki Wada, Osaka; Mitsuhiko Furukawa, Fukuoka; Michito Miyahara, Fukuoka; Masaharu Shiroyama, Fukuoka; Kiyohito Misumi, Kurume; Takashi Kitahira, Fukuoka, all of Japan

[73] Assignees: Sumitomo Special Metal Ltd., Osaka; Nippon Tungsten Co., Ltd., Fukuoka, both of Japan

[21] Appl. No.: 383,329

[22] Filed: May 28, 1982

[30] Foreign Application Priority Data

May 29, 1981 [JP] Japan ................................ 56-83150

[51] Int. Cl.$^3$ .................... C04B 35/49; C04B 35/10; B23B 27/14
[52] U.S. Cl. .................................. 501/105; 264/56; 264/325; 264/332; 360/103; 360/122; 501/104; 501/127; 501/134; 501/135; 501/152
[58] Field of Search ............... 501/104, 105, 127, 134, 501/152, 153; 360/122, 103

[56] References Cited

U.S. PATENT DOCUMENTS

| | | | |
|---|---|---|---|
| 3,301,646 | 1/1967 | Smoot | 501/108 |
| 3,665,436 | 5/1972 | Murray et al. | 360/122 |
| 4,130,847 | 12/1978 | Head et al. | 360/103 |
| 4,194,917 | 3/1980 | Sakemi et al. | 501/119 |
| 4,248,440 | 2/1981 | McCormick | 501/134 |
| 4,251,841 | 2/1981 | Jacobs | 360/122 |
| 4,314,827 | 2/1982 | Leitheiser et al. | 51/309 |
| 4,316,964 | 2/1982 | Lange | 501/127 |
| 4,331,627 | 5/1982 | Yamamoto et al. | 501/153 |

FOREIGN PATENT DOCUMENTS

| | | | |
|---|---|---|---|
| 2741295 | 3/1979 | Fed. Rep. of Germany | 501/153 |
| 38-4341 | 4/1963 | Japan | 501/127 |
| 40-3025 | 2/1965 | Japan | 501/105 |
| 56-19517 | 2/1981 | Japan | 360/122 |

Primary Examiner—Helen M. McCarthy
Attorney, Agent, or Firm—Watson, Cole, Grindle & Watson

[57] ABSTRACT

A material for magnetic head sliders comprises a mixed powder consisting of 40 to 80% by weight of $Al_2O_3$ and 20 to 60% by weight of $TiO_2$, and further contains, per 100 parts by weight of the $Al_2O_3$ and $TiO_2$ mixture, 0.5 to 5 parts by weight of at least one of CaO, MgO and $Y_2O_3$, and 0.5 to 10 parts by weight of $ZrO_2$.

5 Claims, 2 Drawing Figures

4,430,440

MAGNETIC HEAD SLIDER MATERIAL

BACKGROUND OF THE INVENTION

1. Field of the Invention

This invention relates to a material for magnetic disk sliders, or wear-resistant sliding parts for magnetic tape.

2. Description of the Prior Art

Polycrystalline Ni-Zn and Mn-Zn ferrites, monocrystalline Mn-Zn ferrite, or high hardness permalloys have, for example, been used for making magnetic recording or reproducing heads for electronic computers, audio apparatus, and video tape recorders.

Strict requirements for a high recording density and improved wear resistance have resulted in the tendency to use a thin film material for magnetic heads. This has led to the use of individual materials for members of magnetic recording or reproducing circuits, and for sliders or wear-resistant members. More specifically, it is believed that a thin film of Permalloy or Sendust having superior high-frequency magnetic properties is suitable for magnetic circuits, while the use of a material of the alumina series is advisable for wear-resistant members. These wear-resistant members, which are of a non-magnetic nature, must satisfy many requirements, including not only wear resistance but also precision machinability, machining efficiency, strength, structural density, fitness for a recording medium, and lubricant property.

U.S. Pat. No. 4,251,841 to W. G. Jacobs discloses an $Al_2O_3$-TiC material which is excellent in many respects, and one of the optimum materials for magnetic head sliders. It is, however, not always reliable from the standpoint of fitness for a recording medium, or in its lubricant property. The use of a non-magnetic and non-conductive material is advisable for bases. Although a thin-film recording medium made by plating or sputtering is expected to be put to practical use sooner or later, the use of the aforesaid $Al_2O_3$-TiC material may present a certain difficulty, since the medium is very thin, and carries a lubricant protective film thereon. While the soft ferrites which have hitherto been used reliably for a long time have a hardness of Hv 600 to 800, the aforesaid $Al_2O_3$-TiC material has a hardness of Hv 1,900 to 2,100, and may sometimes prove inappropriate for use in conjunction with a thin-film recording medium.

SUMMARY OF THE INVENTION

It is an object of this invention to provide a material which satisfies the various requirements for wear-resistant members for magnetic heads, and is particularly excellent in fitness for a recording medium and lubricant property.

It is another object of this invention to provide an improved sintered mixture of $Al_2O_3$ and other oxides.

According to this invention, there is, thus, provided a material for magnetic head sliders which comprises 40 to 80% by weight of $Al_2O_3$ and 20 to 60% by weight of $TiO_2$, and further contains, per 100 parts by weight of $Al_2O_3$ and $TiO_2$, 0.5 to 5 parts by weight of at least one of CaO, MgO and $Y_2O_3$, and 0.5 to 10 parts by weight of $ZrO_2$.

DESCRIPTION OF THE PREFERRED EMBODIMENT

Figure 1:
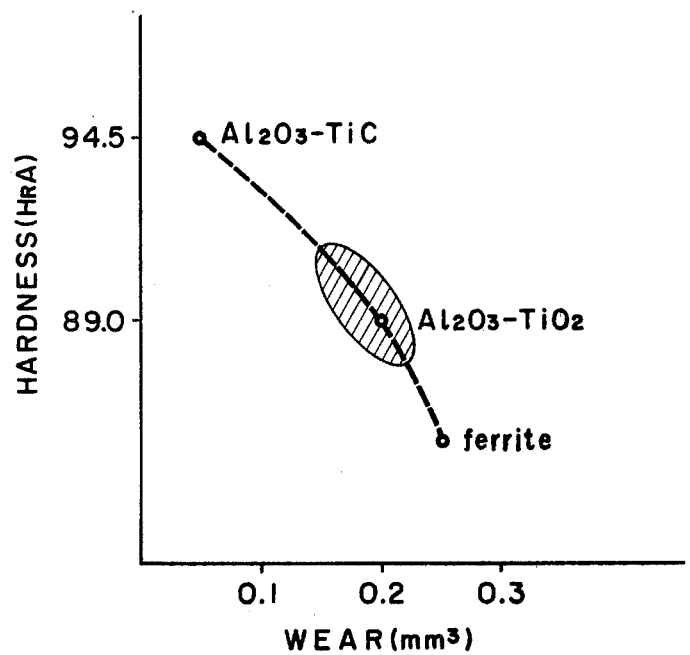
FIG. 1 is a graph showing the relationship between the hardness and wear of a material embodying this invention.

The material for magnetic head sliders according to this invention comprises 40 to 80% by weight of $Al_2O_3$ and 20 to 60% by weight of $TiO_2$ of and further contains, per 100 parts by weight of $Al_2O_3$ and $TiO_2$, 0.5 to 5 parts by weight of at least one of CaO, MgO $Y_2O_3$, and 0.5 to 10 parts by weight of $ZrO_2$, preferably $ZrO_2$ having a purity of at least 99% and an average particle diameter not exceeding 2 microns. A mixture of these compounds is molded, and the molded mixture is sintered, or fired by hot pressing or hot isostatic pressing.

According to this invention, it is important to employ 20 to 60% by weight of $TiO_2$. If the quantity of $TiO_2$ is less than 20% by weight, the sintered product has too high a hardness, and does not substantially differ from the $Al_2O_3$-TiC material disclosed in the aforesaid U.S. patent. If it exceeds 60% by weight, voids are likely to form, and make the material inappropriate for magnetic heads.

$ZrO_2$ is employed with improving the lubricant property of the material. This purpose is not satisfactorily attained if its quantity is less than 0.5 part by weight. If it exceeds 10 parts by weight, however, the hardness of the material is lowered undesirably. The presence of $ZrO_2$ is also useful for restricting the growth of $Al_2O_3$-$TiO_2$ particles, and improving the sinterability of $Al_2O_3$-$TiO_2$. If its quantity exceeds 10 parts by weight, however, the sintered product is likely to crack.

The material of this invention further contains at least one of CaO, MgO and $Y_2O_3$. If its or their quantity is less than 0.5 part by weight, however, $ZrO_2$ fails to remain sufficiently stable to maintain the free cutting property of the material. If it exceeds 5 parts by weight, the free cutting property of the material is improved, but $ZrO_2$ is so stable that the material has too high a coefficient of thermal expansion.

The $Al_2O_3$-$TiO_2$ material of this invention shows intermediate properties between the known ferrite and $Al_2O_3$-TiC material, and excellently satisfies the various requirements for the magnetic head slider material. It is, above all, superior in fitness for a recording medium and lubricant property.

The invention will now be described more specifically by way of example.

EXAMPLE

Three parts by weight of monoclinic $ZrO_2$ having a purity of 99.8% and an average particle diameter of 1 micron, and one part by weight of MgO having a purity of 99% and an average particle diameter of 1 micron were employed for 100 parts by weight of a mixed powder consisting of 60% by weight of $Al_2O_3$ having a purity of 99.9% and an average particle diameter of 0.6 micron and 40% by weight of $TiO_2$ having a purity of 99.9% and an average particle diameter of 0.3 micron. They were mixed and pulverized for 20 hours in a wet ball mill lined with rubber. After the resulting mixed powder had been dried, it was heat treated at a temperature not exceeding 1,300° C., and placed in a graphite mold measuring 50 mm square by 60 mm in height. The powder was held for 60 minutes under a pressure of 200 kg/cm² at a temperature of 1,350° C. to 1,600° C., and was, then, released from the pressure, and allowed to cool, whereby there was obtained a sintered product measuring 50 mm square by 5.5 mm in thickness.

The sintered product showed the following properties:

a. Specific gravity: 3.99 to 4.0;
b. Hardness: HrA 89.1 to 89.3, or Hv 1,250 to 1,350;
c. Breaking strength: 46 to 48 kg/mm$^2$;
d. Thermal conductivity: 0.0273 cal/mm sec.°C.;
e. Electrical resistance: $10^6$ Ωcm or above.

The sintered product was ground by a diamond grindstone to form a rectangular parallelepiped measuring 2 mm by 4 mm by 20 mm long. This testpiece was formed at one end with a pointed edge. It was tested for wear resistance by a pin-disk method, namely, by placing the pointed edge of the sintered product in contact with a rotating donut of ferrite having an outside diameter of 45 mm, an inside diameter of 10 mm and a thickness of 10 mm. For comparison purposes, similar wear resistance tests were conducted on samples of known polycrystalline Mn-Zn ferrite containing 32% by weight of MnO, 15% by weight of ZnO and 52% by weight of Fe$_2$O$_3$, and Al$_2$O$_3$-TiC material consisting of 70% by weight of Al$_2$O$_3$ and 30% by weight of TiC.

Figure 2:
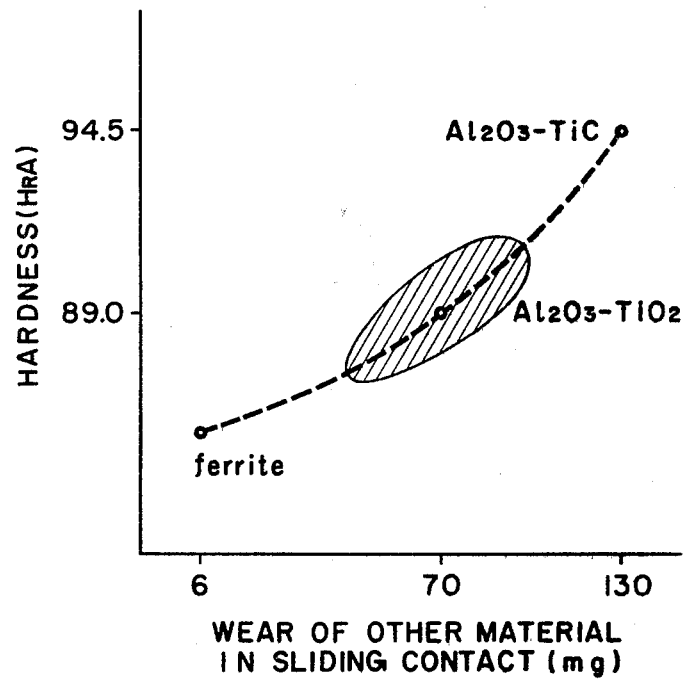
FIG. 2 is a graph showing the relationship between the hardness of a material embodying this invention and another material placed in sliding contact with the material of this invention.

The test results are shown in FIG. 1 by way of a relationship between the hardness and wear of the testpieces, and in FIG. 2 by way of a relationship between the hardness and wear of the material with which the testpieces were placed in contact. In both of FIGS. 1 and 2, slanting lines approximately indicate the results obtained on the material of this invention. It is noted therefrom that the alumina-based material of this invention has an intermediate hardness between those of the known ferrite and Al$_2$O$_3$-TiC materials, and is excellent for a magnetic head slider material. It is, above all, superior in fitness for a recording medium and lubricant property, and is, therefore, suitable for use in conjunction with a thin-film recording medium.

What is claimed is:

1. A wear-resistant product which is useful in fabricating magnetic head sliders, said product consisting essentially of 40 to 80% by weight of Al$_2$O$_3$, 20 to 60% by weight of TiO$_2$, 0.5 to 5 parts by weight, based on 100 parts by weight of combined Al$_2$O$_3$ and TiO$_2$, of at least one oxide selected from the group consisting of CaO, MgO and Y$_2$O$_3$, and 0.5 to 10 parts by weight, based on 100 parts by weight of combined Al$_2$O$_3$ and TiO$_2$, of ZrO$_2$ which has a purity of at least 99.0% and maximum particle diameters of 2 microns; said product having a hardness of between about 89.0 and 89.3 (HrA) and a wear resistance of between about 0.1 and about 0.3 mm$^3$ (pin-disk method).

2. A wear-resistant product as defined in claim 1 which has been formed by hot isostatic pressing.

3. A wear-resistant product as defined in claim 1 which has been formed by sintering.

4. A wear-resistant product as defined in claim 1 which displays a specific gravity of 3.99 to 4.0, a hardness of 89.1 to 89.3 (HrA), a breaking strength of 46 to 48 Kg/mm$^2$, a thermal conductivity of about 0.0273 cal/mm sec.°C., and an electrical resistance of at least $10^6$ Ωcm.

5. A magnetic head slider which includes the wear-resistant product of claim 1.

* * * * *